United States Patent
Gowda et al.

(10) Patent No.: US 9,621,340 B1
(45) Date of Patent: Apr. 11, 2017

(54) METHOD AND DEVICE FOR DETECTING PRIMARY SYNCHRONIZATION SIGNAL IN LTE AND LTE ADVANCED COMMUNICATION SYSTEM

(71) Applicant: LEKHA WIRELESS SOLUTIONS PVT LTD, Bangalore (IN)

(72) Inventors: Niranjan Mylarappa Gowda, Mysore (IN); Sreenath Ramanath, Bangalore (IN)

(73) Assignee: Lekha Wireless Solutions Pvt Ltd., Karnataka, Bangalore, OT (IN)

( * ) Notice: Subject to any disclaimer, the term of this patent is extended or adjusted under 35 U.S.C. 154(b) by 0 days.

(21) Appl. No.: 14/959,087

(22) Filed: Dec. 4, 2015

(30) Foreign Application Priority Data

Dec. 7, 2014 (IN) .......................... 6170/CHE/2014
Dec. 29, 2014 (IN) .......................... 6683/CHE/2014

(51) Int. Cl.
*H04L 7/00* (2006.01)
*H04L 7/08* (2006.01)
*H04W 56/00* (2009.01)
*H04L 27/00* (2006.01)

(52) U.S. Cl.
CPC .......... *H04L 7/08* (2013.01); *H04W 56/0015* (2013.01); *H04L 2027/0034* (2013.01)

(58) Field of Classification Search
None
See application file for complete search history.

(56) References Cited

U.S. PATENT DOCUMENTS

| | | | | |
|---|---|---|---|---|
| 6,172,828 B1 * | 1/2001 | Tsunoda | ............. | G11B 5/59605 360/46 |
| 6,278,733 B1 * | 8/2001 | Bennett | ............ | H04N 21/23614 375/240 |
| 8,194,802 B2 * | 6/2012 | Bae | ..................... | H04L 27/2666 370/203 |

OTHER PUBLICATIONS

Gowda N. M, Ramanath S, Robust synchronization-signal detection for cell identification in 3GPP LTE and LTE-advanced receivers, Proceedings of the 7th International Conference on Communication Systems and Networks (COMSNETS), Jan. 6-10, 2015, Bangalore, India.

* cited by examiner

*Primary Examiner* — Shuwang Liu
*Assistant Examiner* — Gina McKie (57) ABSTRACT

The input samples transmitted by the base station are decimated and the decimated samples are correlated with the three reference PSS sequences to obtain the correlation results. The correlation results are differentially combined to obtain the hypotheses. The hypotheses are grouped into windows. The peaks across windows of multiple half frames are selected and obtained peaks are averaged over the multiple half frames to detect the half frame boundary window. Reference PSS versions are generated for ICFO estimation. The hypotheses are generated in the HFBW. The highest averaged hypothesis is selected to estimate ICFO. The ICFO error is corrected by adjusting a reference clock signal. The decimated samples are correlated and differentially combined around the HFB to determine a HFB and a FCFO from the peak value of the hypotheses. The received samples are correlated and differentially combined around the half frame boundary to further refine HFB and FCFO estimations.

8 Claims, 12 Drawing Sheets

METHOD AND DEVICE FOR DETECTING PRIMARY SYNCHRONIZATION SIGNAL IN LTE AND LTE ADVANCED COMMUNICATION SYSTEM

CROSS REFERENCES TO RELATED APPLICATIONS

This application claims priority from Indian patent application No. 6170/CHE/2014 filed on Dec. 7, 2014 and Indian patent application No. 6683/CHE/2014 filed on Dec. 29, 2014 which is incorporated herein in its entirety by reference.

STATEMENT REGARDING FEDERALLY SPONSORED RESEARCH OR DEVELOPMENT

Not Applicable

COPYRIGHT NOTIFICATION

No Copyright Notification

BACKGROUND

Technical Field

The present disclosure relates generally to a wireless communication system and more specifically to a method and device for detecting Primary Synchronisation Signal in LTE and LTE-Advanced communication system.

Related Art

The 3GPPs (3rd Generation Partnership Project) Long Term Evolution (LTE) refers to a standard for wireless communication of high speed data for mobile phones and terminals. LTE allows operators to use new and wider spectrum and complements 3G networks with higher data rates, lower latency. LTE Advanced standard is an enhancement on the LTE standard. LTE advanced standard includes higher order MIMO, carrier aggregation and heterogeneous networks which improves spectral efficiency per unit area.

In LTE and or LTE advanced, there are 504 unique cell ids (base station ids) and they are generally referred as physical layer cell identities (PLO). Further, PLCI are grouped into 168 physical cell groups (PLCG/$N_{id}^1$) with three physical layer identities (PLI/$N_{id}^2$) in each group. Signals transmitted by the base stations carry physical layer cell identities and physical layer cell groups. The part of the signal carrying PLCG is generally referred to as secondary synchronisation signal (SSS). The part of the signal carrying PLI is referred to as primary synchronisation signal (PSS).

In LTE communication network, the receivers/UEs (User equipments) are configured to establish communication and exchange information as per the LTE and or LTE advanced standards. Briefly, UEs first detect the half frame boundary and Physical layer group identities using known PSS signals. In general, the receivers correlate known PSS signal to determine the PLI and also to determine the frame boundaries as is well known in the art. Subsequently, having synchronised to the received signal the data is decoded.

However, conventional UE may not detect PSS accurately in presence of various impairments such as multipath channel, Doppler, noise, mismatch between BS (base station) and user equipment (UE) or mobile device clocks, presence of carrier frequency offset and sampling frequency offset etc. Often, conventional UE may fail to detect PSS due to presence of severe impairments. As a result UE may not establish communication with the base station.

SUMMARY

According to an aspect, the input samples transmitted by the base station are decimated and the decimated samples are correlated with the three reference PSS sequences to obtain the correlation results. The correlation results are differentially combined to obtain the hypotheses. The hypotheses are grouped into windows. The peaks across windows of multiple half frames are selected and the obtained peaks are averaged over the multiple half frames to detect the half frame boundary window. According to another aspect, reference PSS versions are generated for ICFO estimation. The hypotheses are generated by correlating and differentially combining the reference sequences with the input samples in the half frame boundary window. The highest averaged hypothesis is selected to estimate ICFO. The ICFO error is corrected by adjusting a reference clock signal. According to yet another aspect, the decimated samples are correlated and differentially combined around the half frame boundary to determine a HFB and a FCFO from the peak value of the hypotheses. According to yet another aspect, the received samples are correlated and differentially combined around the half frame boundary to further refine HFB and FCFO estimations.

Several aspects are described below, with reference to diagrams. It should be understood that numerous specific details, relationships, and methods are set forth to provide a full understanding of the present disclosure. One skilled in the relevant art, however, will readily recognize that the present disclosure can be practiced without one or more of the specific details, or with other methods, etc. In other instances, well-known structures or operations are not shown in detail to avoid obscuring the features of the present disclosure.

DETAILED DESCRIPTION

Figure 1:
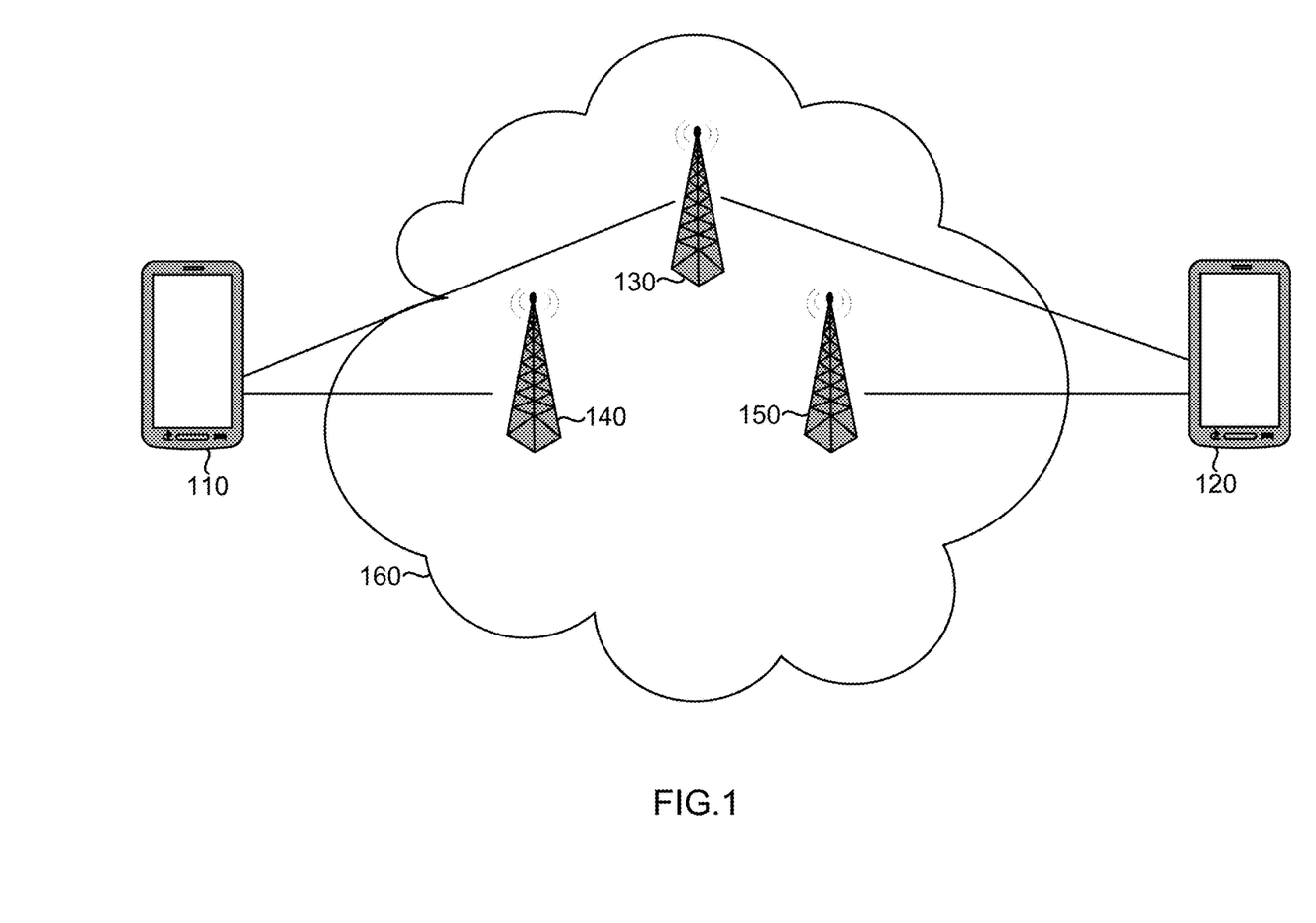
FIG. 1 is an example environment in which various aspects of the present disclosure may be seen.

FIG. 1 is an example environment in which various aspects of the present disclosure may be seen. As shown, the environment may comprise, for example, user equipments UE (mobile stations) 110 and 120, base stations 130 through 150. The cloud 160 represents the LTE or LTE advanced standard that may allow the user equipment 110/120 to receive signals from the base stations 130/140/150.

In an example environment, the base stations or cells 130 through 150 in a cellular network may be identified by their cell id's. A base station 130/140/150 transmits synchronisation signals in every radio frame to facilitate cell search on the UE 110/120. These signals may be defined for each PLCI and may be known to user equipment 110/120. The user equipment 110/120 detects one of the three PLI and searches for PLCG. The primary and secondary synchronisation signals carry information of PLI and PLCG respectively. Thus the base station or cell 130/140/150 is identified through the cell-id information carried by the primary synchronization signal and the secondary synchronization signal. The manner in which the PSS may be determined with enhanced accuracy and in adverse conditions is further described below by first describing the frame structure for continuity.

Figure 2A:
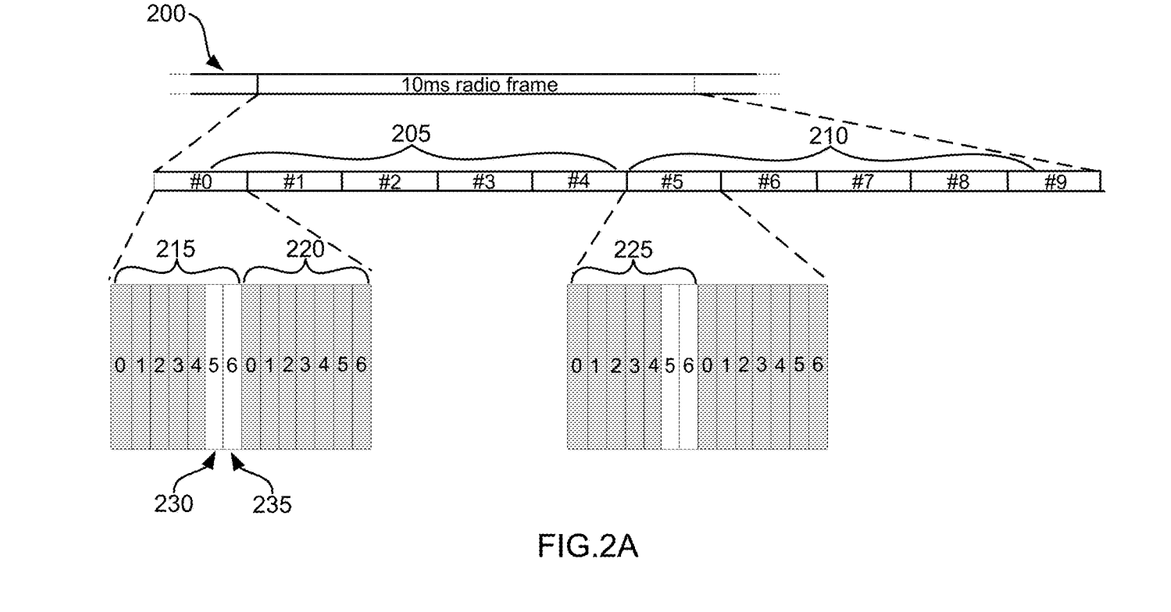
FIG. 2A depicts example 10 ms radio FDD frame adapted in the downlink transmissions of normal CP (cyclic prefix)-LTE communication system.

FIG. 2A depicts example 10 ms radio FDD (Frequency Division Duplex) frame adapted in the downlink transmissions of normal CP (cyclic prefix)-LTE communication system. The 10 ms frame 200 comprises two half frames 205 and 210. The length of the half frame 205/210 is 5 ms. The LTE half frames 205 and 210 are further divided into five subframes each 1 ms long. The 1 ms frame is further subdivided into two slots 215 and 220. Thus each frame comprises 20 slots and referred by the order starting from 0 to 19 as is well known in the art. The number of OFDM symbols in each slot in normal-CP (cyclic prefix) mode is 7.

In FDD and normal-CP based LTE, PSS 235 is inserted in the last symbol of 0th slot 215 and 10th slot 225 of every frame. Similarly in every frame, two distinct SSS 230 are inserted in two half frames, in the symbol before PSS. PSS 235 arrives as a symbol in specific slot for example it may be 0th slot 215. The PSS 235 is defined based on Zadoff-Chu sequences of length 63 which have good auto correlation properties. The manner in which the PSS information is embedded into the symbol is described below in further detail.

Figure 2B:
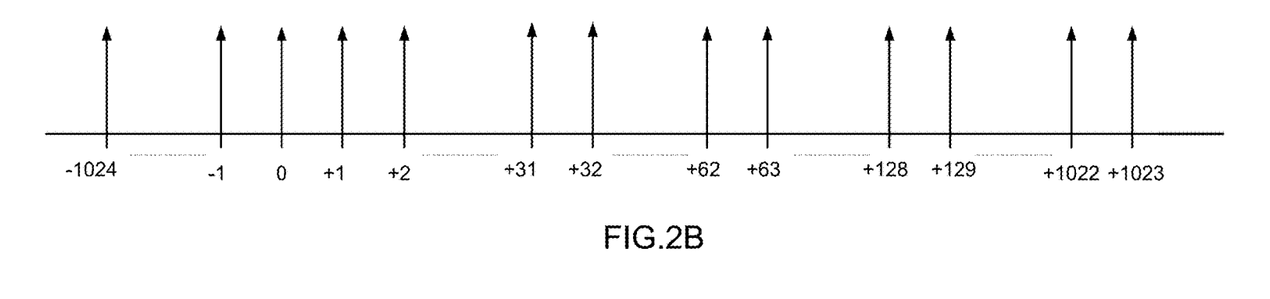
FIG. 2B is an example frequency spectrum of 2048 point FFT modulated LTE frame in that PSS information is carried by frequency tones −31 through +31.

FIG. 2B is an example frequency spectrum of 2048 point FFT modulated symbol in the LTE frame. In that PSS information is carried by frequency tones −31 through +31. As shown, The FFT size (2048) is selected based on the available bandwidth. For example, 2048 point FFT, 1024 point FFT and 128 point FFT may be used for the frequencies 20 MHz, 10 MHz and 1.4 MHz respectively. In all these, the PSS 235 information is embedded at the centre of the FFT as shown.

Figure 2C:
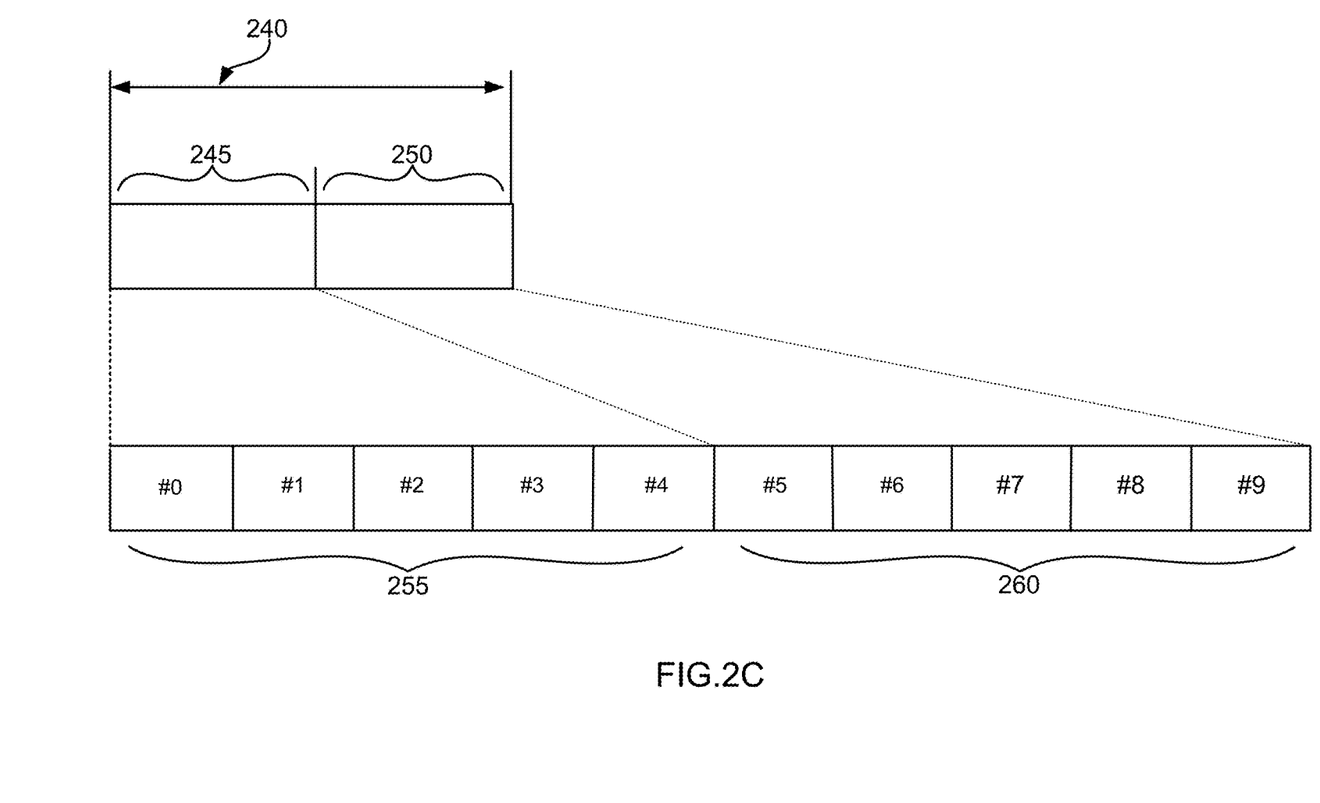
FIG. 2C depicts example 10 ms radio TDD frame adapted in the downlink transmissions of normal CP (cyclic prefix)-LTE communication system.

FIG. 2C depicts example 10 ms radio TDD (Time Division Duplex) frame adapted in the downlink transmissions of normal CP (cyclic prefix)-LTE communication system. The 10 ms frame 240 comprises two half frames 245 and 250. The length of the half frame 245/250 is 5 ms. The LTE half frames 245 and 250 are further divided into five subframes 255 and 260 each 1 ms long respectively. Each frame is referred by the order starting from 0 to 9. In TDD and normal CP based LTE, PSS is inserted in the symbol #2 of subframe #1 and SSS is the last symbol of subframe #0. Thus detection of PSS remains same for the TDD system.

Continuing further with reference to the detection of PSS for the FDD system, in a conventional receiver received each symbol or the frame is converted to time domain by performing IFFT operation. The sequences of digital samples are correlated with corresponding time domain reference samples of the PSS. The manner in which the correlation is performed is described below in further detail.

Figure 3:
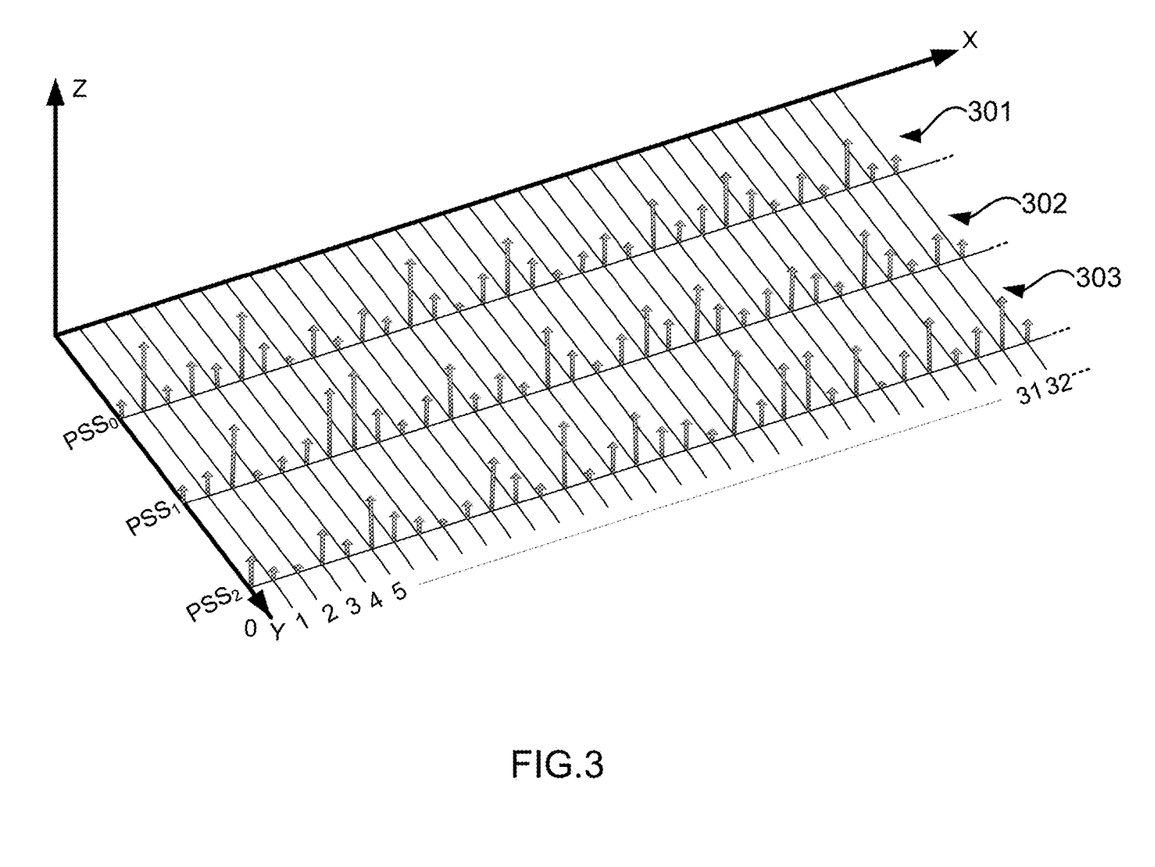
FIG. 3 depicts example hypotheses (correlation values) peak characteristics required for detecting PSS and HFB.

FIG. 3 depicts example correlation values across multiple samples. As shown in FIG. 3, X-axis represents the sample location, Y-axis represents the local PSS sequences and Z-axis represents the hypotheses magnitude.

In conventional method, the sampling rate of the received digital samples is reduced. The digitized samples with reduced sampling rate are cross correlated with the local PSS sequences of UE. For example, 128 samples may be correlated with the three local PSS sequences $PSS_0$ through $PSS_2$ which is represented along Y-axis. The resultant correlation results are referred as hypotheses 301 through 303 with respect to PSS sequences $PSS_0$ through $PSS_2$. For 128 point FFT, the hypotheses length $h_f$ is 9600. Thus, the hypotheses are referred by the order stating from 0 to 9599. The cross correlation is performed between received samples from one half frame and local PSS sequence to obtain the hypotheses. The hypotheses obtained in the second half frame are added with the first half frame. Similarly the hypotheses are averaged over multiple frames or n frames. The grid search is performed to select the peak and wherever the peak is present that is referred as HFB (half frame boundary). The local PSS (represented along y-axis) corresponding to the HFB is referred as the recovered PLI ($N_{id}^2$).

In the conventional method, the multiple peaks are obtained under various conditions such as multipath, Doppler, noise etc. FIG. 3 illustrates example scenario in which multiple peaks are obtained under various impairments. Such multiple peaks may result in the false or inaccurate detection of PSS.

The manner in which PSS may be detected and further used for synchronisation according to present disclosure that may overcome some of the limitation of the prior technique is described below in further detail.

Figure 4:
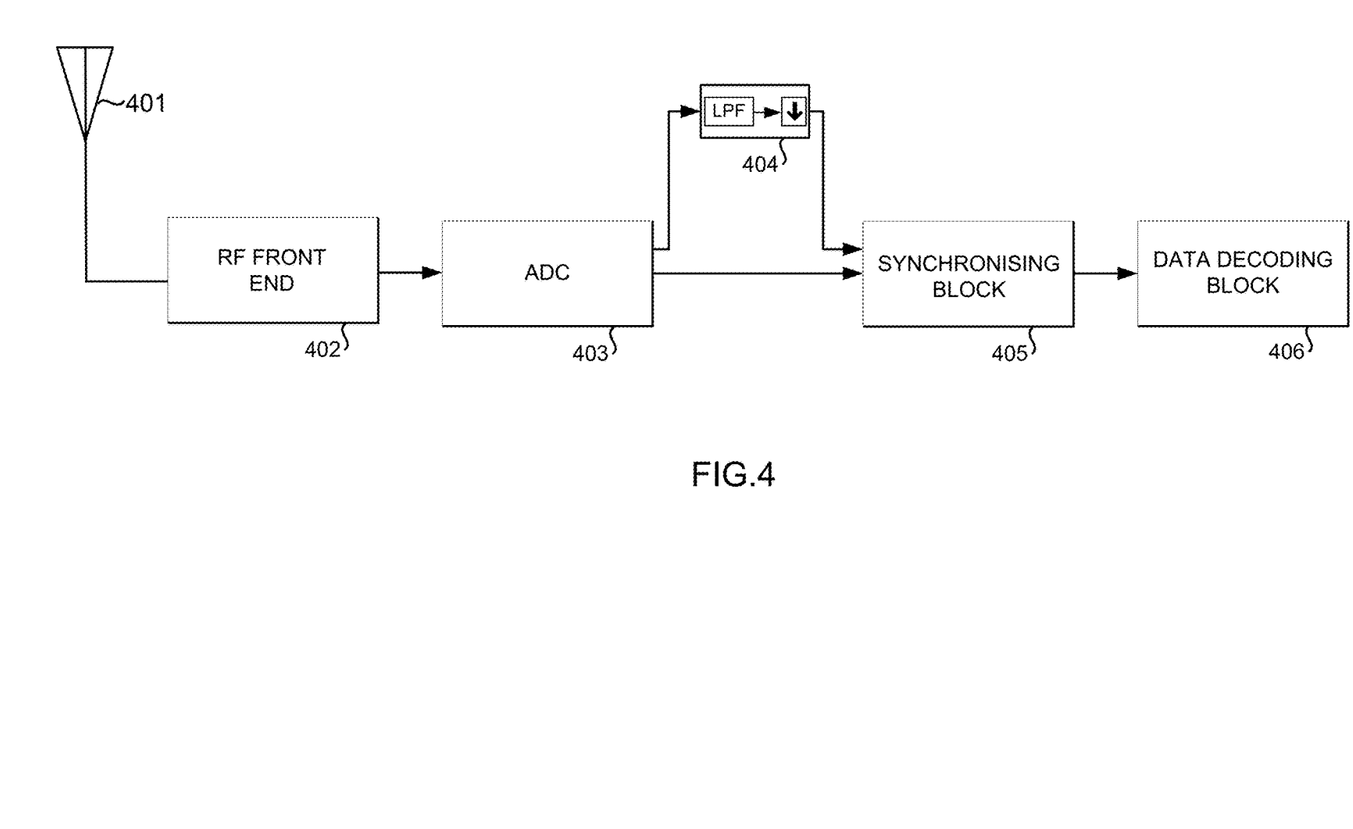
FIG. 4 is an exemplary receiving device in one embodiment.

FIG. 4 is an exemplary receiving device in one embodiment. The receiving device is shown comprising an antenna 401, RF receiver 402, A/D converter 403, block 404 (decimator) comprising low pass filter LPF and down sampler, synchronising block 405 and data decoding block 406. The function of each block is described below.

The MIMO receiver/antenna 401 comprising multiple antennas or single antenna of the user equipment receives a RF signal from the base station. The received RF signal may be provided to an RF port 402. The bandwidth of the received signal may be 20, 15, 10, 5, 3, 1.4 MHz. The system bandwidth may be represented in master information block MIB (information broadcasted by the LTE eNodeB). The MIB is transmitted using a physical channel PBCH (Physical broadcast channel) on downlink. The MIB is extracted by decoding PBCH after synchronisation. Thus, RF front end may be aware of the signal bandwidth after synchronisation. The RF front end process the signal at the original incoming frequency. For example, the frequency of the original signal may be 20 MHz. The FFT size for 20 MHz frequency signal may be 2048. The processed signal may be provided to A/D converter 403.

The analog to digital converter (A/D) 403 converts analog signal into digital form. The A/D converter chips may include some of the support circuitry such as clock oscillator for the sampling clock, reference, the sample and hold function and output data latches. The clock (sampling clock) input to the A/D converter may be provided from a local oscillator. The accuracy of the sampling clock is critical in the operation of the A/D converter. The A/D converter may be defined by its bandwidth (data rate). Thus, A/D converters may be selected based on the bandwidth and required signal to noise ratio of the signal to be quantized. The digitised samples may be provided to the decimator 404. Alternatively, the output samples from the A/D converter may be directly provided to the synchronising block 405.

The decimator 404 decimates or reduces the sampling rate of the signal. The decimator 404 performs low pass filtering, followed by down sampling. The filtering part may be implemented either by using FIR or IIR filters. Filtering part may be used to mitigate aliasing distortion which may occur during down sampling of a signal. Decimation factor is an integer or a rational fraction greater than one. Decimation factor multiplies the sampling time or equivalently divides the sampling rate. For example, the decimator reduces the sampling rate of the signal from 20 MHz to 1.4 MHz. The FFT size may be reduced to 128. The decimated signal may be provided to the synchronising block 405.

In data decoding block 406, the information present in the received signal may be recovered. After the detection of PSS, SSS may be detected. On successful detection of PSS and SSS, the UE is enabled to perform the cell search procedures, extract the system information to establish the cell identity.

In synchronising block 405, PSS may be detected by correlating the received signal with the local PSS of the user equipment. In one embodiment, the synchronising block 305 detects PSS under various operating conditions that are prone to cause errors. The synchronising block 405 performs the operations like detection of HFB (half frame boundary), estimation and correction of Integer carrier frequency offset ICFO (the nearest integer when CFO is expressed as multiple of subcarrier spacing), estimation of fractional carrier frequency offset FCFO (the residual part of CFO). The manner in which the synchronising block may detect PSS under various impairments is further described in detail below.

Figure 5A:
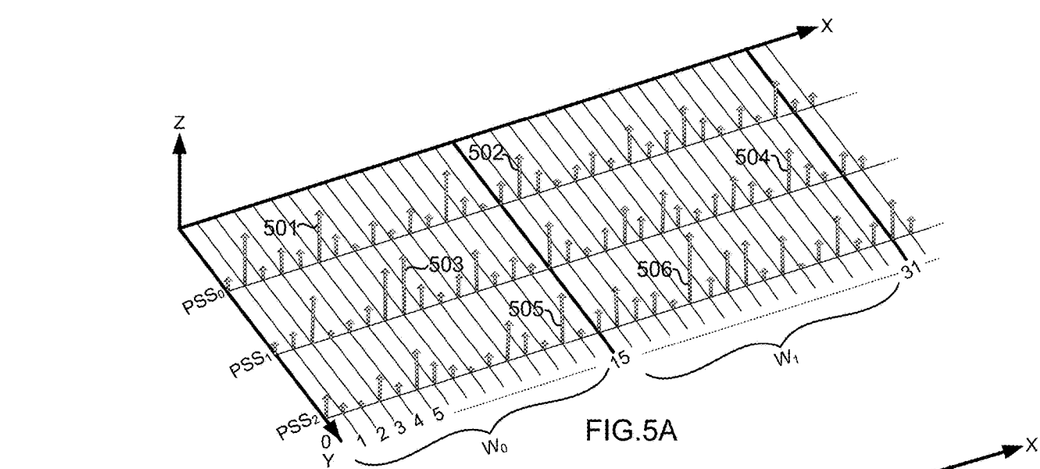
FIG. 5A and FIG. 5B are example diagrams illustrating the manner in which highest peak from a set of peaks is selected for determining PSS in one embodiment.
Figure 5B:
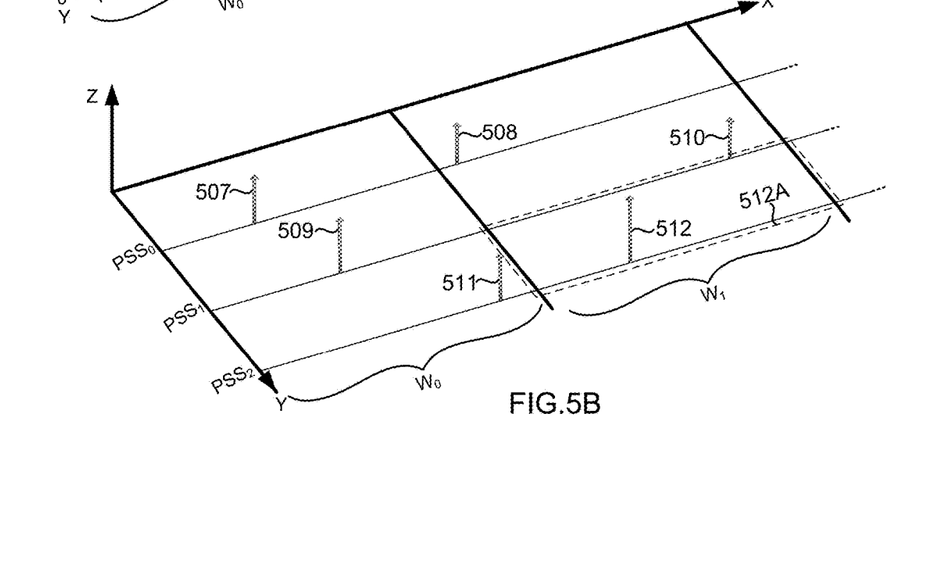

FIG. 5A and FIG. 5B are example diagrams illustrating the manner in which highest peak from a set of peaks is selected for determining PSS in one embodiment. As shown, X-axis represents the hypotheses (differentially combined correlated values), Y-axis represents the three local PSS sequences $PSS_0$ through $PSS_2$ and Z-axis represents the magnitude of the hypotheses peaks. The values $W_0$, $W_1$ represents the window position.

The three local PSS sequences $PSS_0$ through $PSS_2$ of UE may be correlated with the samples (in this case 128) received from the decimator. In one embodiment, the differentially combined correlated values may be referred as the hypotheses and the hypotheses may be numbered in the order from 0 to 9599 for 128 point FFT. The hypotheses may be grouped to form windows $W_0$, $W_1$ as shown. For example, sixteen hypotheses may be grouped to form one window for 128 point FFT. Thus, six hundred windows may be formed and each window size may comprise sixteen hypotheses. The number of hypotheses for each window depends on user or application requirements and thus number of hypotheses may be 2, 4, 6, 8, 16 etc. The windows may be formed with respect to each local PSS sequence.

The peak may be selected across each window $W_0$, $W_1$ of size sixteen with respect to each local PSS sequence. For example, for $PSS_0$, peaks 501 and 502 (having highest correlation values in the window $W_0$ and $W_1$ respectively) may be selected over $0^{th}$ window $W_0$ and $1^{st}$ window $W_1$ respectively (For example). For $PSS_1$, peaks 503 and 504 may be selected over $0^{th}$ window $W_0$ and $1^{st}$ window $W_1$ respectively. For $PSS_2$, peaks 505 and 506 may be selected over $0^{th}$ window $W_0$ and $1^{st}$ window $W_1$ respectively. Similarly, peaks may be selected over six hundred windows (not shown). The manner in which window having highest peak may be selected by averaging the peaks over multiple frames is further described below.

The peaks from the respective windows may be selected over the next n consecutive half frames. The hypotheses associated with the peaks generated over the respective windows to obtain averaged peak. For example, peaks of window 501, 601, 1201 etc., for n half frames may be averaged over n half frames for window $W_0$. In other words, hypotheses 501 obtained over window $W_0$ of one half frame may be averaged with the hypotheses obtained over window $W_0$ of next half frame (not shown).

Thus, in FIG. 5B, peaks 507 through 512 may represent the peaks due to averaging the peaks of the hypotheses over n half frames. Accordingly, the peak 512 may be selected as the highest peak. The hypothesis associated with the peak 512 is derived from the local $PSS_2$ sequence and the window corresponding to the peak 512 may be selected as half frame boundary window (HFBW) 512A. The $PSS_2$ corresponding to the HFBW 512A may be selected as transmitted PSS from the BS. The scenario in which the hypotheses peaks represent the window position is further described below.

Figures 5C, 5D:
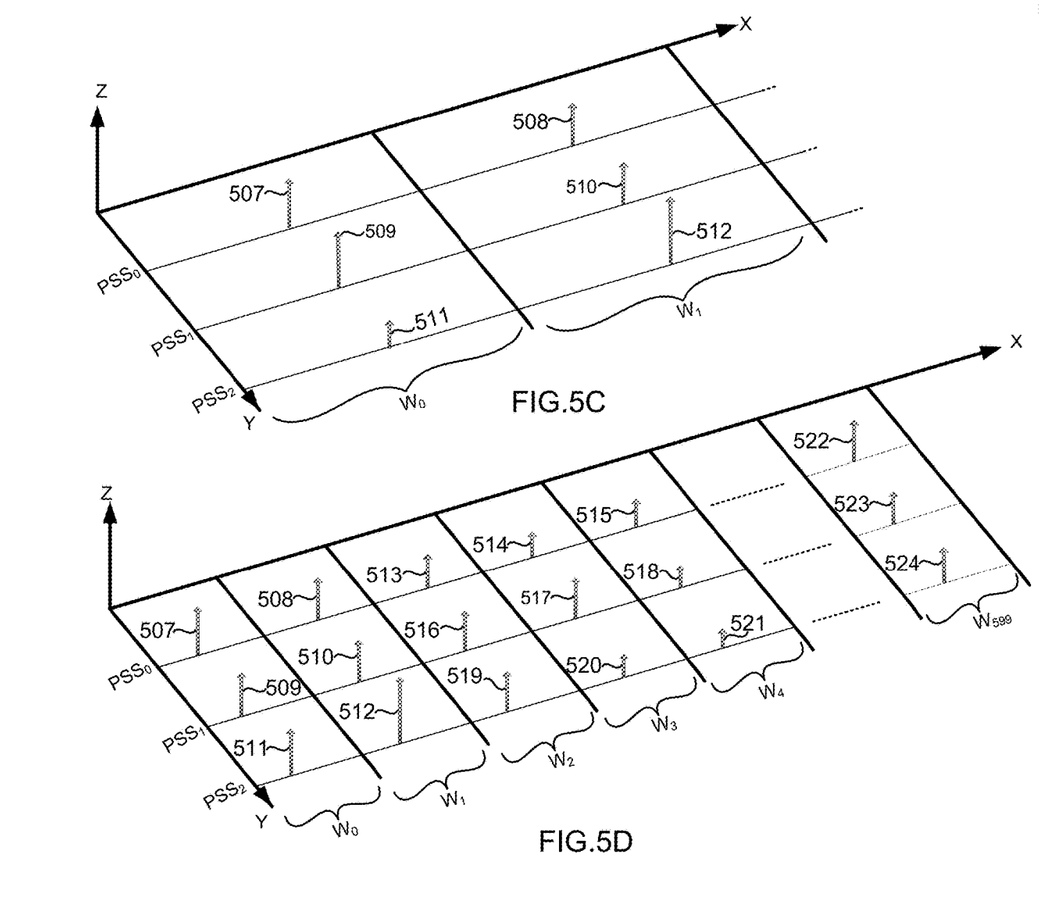
FIG. 5C depicts the scenario in which the hypotheses peaks represent the window position in one embodiment.
FIG. 5D depicts example hypotheses peaks over multiple windows in one embodiment.

FIG. 5C depicts the scenario in which the hypotheses peaks represent the window position in one embodiment. As shown, X-axis represents the hypotheses, Y-axis represents the three local PSS sequences $PSS_0$ through $PSS_2$, and Z-axis represents the magnitude of the hypotheses peaks. The values $W_0$, $W_1$ represents the windows position.

After selecting the peaks over windows, the hypotheses peaks represent the window position. FIG. 5C illustrates an example scenario in which the sampling positions may not be represented by the hypotheses peaks 507 through 512 selected across windows $W_0$, $W_1$. The manner in which the peaks may be selected over multiple windows is described below.

FIG. 5D depicts example hypotheses peaks over multiple windows in one embodiment. As shown, X-axis represents the hypotheses, Y-axis represents the three local PSS sequences $PSS_0$ through $PSS_2$, and Z-axis represents the magnitude of the hypotheses peaks. The values $W_0$, $W_1$ ... $W_{599}$ represents the windows position.

As shown, FIG. 5D represents the peaks selected over the multiple windows. The peaks 507 through 521 may be selected over windows $W_0$ through $W_4$ and the peaks 522 through 524 may be selected over window $W_{599}$. The peaks 507 through 524 represent the window position. The manner in which HFBW may be determined is further described below.

Figure 6:
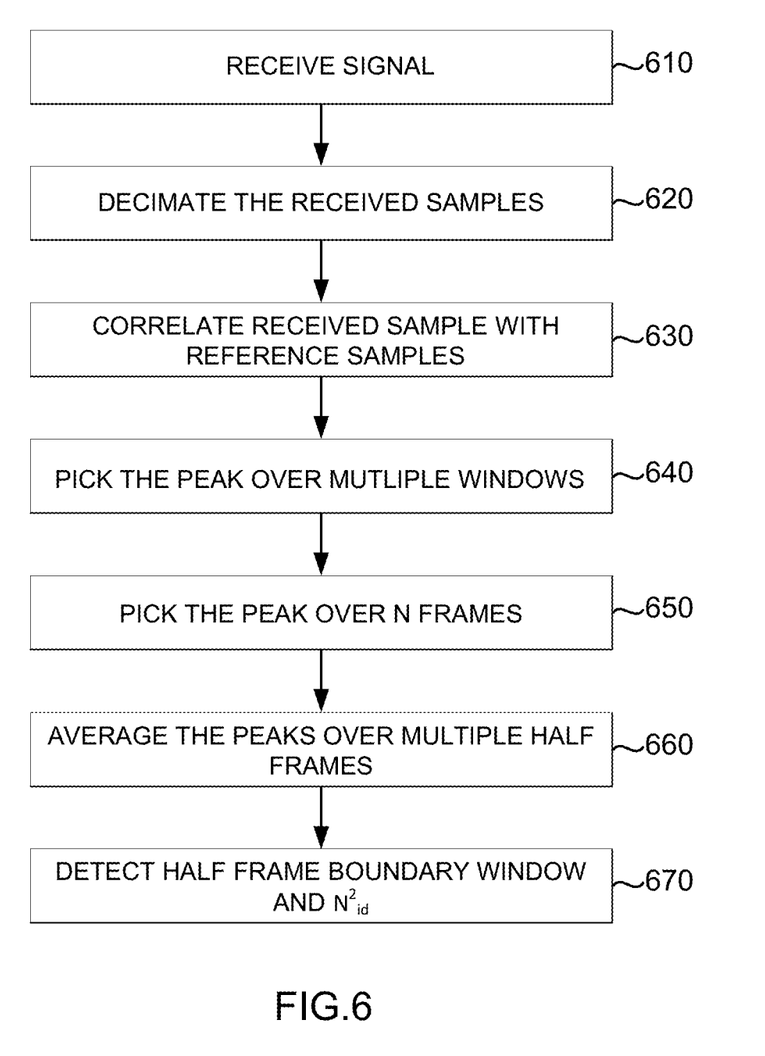
FIG. 6 is a block diagram further describing the determination of Half Frame Boundary Window (HFBW) in one embodiment.

FIG. 6 is a block diagram further describing the determination of Half Frame Boundary Window (HFBW) in one embodiment. In block 610, the user equipment receives a signal from the base station. The antenna in the user equipment receives the signal from the base station. The received signal may be provided as an input to the A/D converter. The converted samples (or digital samples) may be provided to the decimator. The received samples may be represented as $$\left\{ r(j) \colon j = 0, 1, \ldots \cdot \frac{L_f}{2} - 1 \right\} \quad (1)$$

In which, r(j) represents the received samples; $L_f$ represents the frame length in samples.

In block 620, the decimator reduces the sampling rate of the received samples. For set of bandwidths 20, 15, 10, 5, 3, 1.4 MHz, the decimation factors may be selected as 16, 12, 8, 4, 2, and 1 respectively. For example, the decimator provides 1.92 Mega samples per second for 1.4 MHz and the FFT size may be 128. Alternatively, in one embodiment, the decimated samples are processed as the PSS information present at the centre frequency tones of the modulated FFT in frequency spectrum.

In block 630, the synchronizer 405 correlates the decimated samples with the reference PSS sequences (local PSS of UE). The reference sequence may be grouped into first half sequence and second half sequence and synchronizer correlates each half of the reference sequence with the corresponding groups of the received signal. For example, the received sequence at the m position may be into first and second group. The first and the second group of the received signal at the m position may be represented as (m, 0) and (m, 1) respectively. The first half of the reference sequence may be correlated with the received sequence at $(m, 0)^{th}$ position to provide correlation value $v_0$. The next half of the reference sequence may be correlated with the received signal at $(m, 1)^{th}$ position to provide the correlation value $v_1$.

The synchronizer 405 continues to perform the correlation on received sequences until the received signal may be at the last sample position of the half frame. The reference sequence may be represented by the relation:

$$\{P(j);j=0,1,\ldots,N-1\} \quad (2)$$

in which, P(j) represents the reference sequence (local PSS) in time domain. The position wise multiplication of samples may be performed to obtain correlation values for example $v_0$, $v_1$. Further, correlation values may be differentially combined to get a hypothesis ($h_p$ (n)). The hypothesis $h_p(n)$ (For example, as shown in FIG. 5A) may be represented by the following relation:

$$h_p(n)=v_1(n)v_0(n)^* \quad (3)$$

in which, * represents the complex conjugate operation, $v_1(n)$ and $v_2(n)$ are the correlation values. The correlation value may be represented by the relation:

$$v_i(n) = \sum_{m=0}^{N/2} r\left(m+n+\frac{iN}{2}\right) P*\left(m+\frac{iN}{2}\right) \quad (4)$$

in which, i=0, 1 n=0, 1 . . . $L_f/2-1$.

The peak of the hypothesis ($h_p$ (n)) may provide an estimate of HFB (half frame boundary). To counter sampling frequency offset, the hypotheses of each half frame may split into multiple length windows of equal size. For example, for 1.4 MHz frequency with 128 point FFT, 9600 hypotheses may be divided into six hundred windows each of size sixteen (for example, as shown in FIG. 5A).

Due to the correlation performed by dividing the received and reference sequence into two halves and also by differential combining, the effect of fractional carrier frequency offset (FCFO) may be reduced. Multiplying the complex conjugate of the first half correlation value with the second half correlation value (as represented by relation 3) addresses the FCFO.

For example, the FCFO is equivalent to phase ramp and FCFO may be represented as $\Delta f$ in time index $e^{j2\pi\Delta fnT_s}$. The first half correlation may be represented as $\Sigma_{n=0}^{63} e^{j2\pi\Delta fnT_s}$. The second half correlation may be represented as $\Sigma_{n=64}^{127} e^{j2\pi\Delta fnT_s}$ and the second half correlation value may be simplified as $e^{j2\pi\Delta f64T_s} \Sigma_{n=0}^{63} e^{j2\pi\Delta fnT_s}$. The result of the multiplying the complex conjugate of the first half correlation value with the second half correlation value complex conjugate may be represented as $\Sigma_{n=0}^{63} e^{j2\pi\Delta fnT_s} \Sigma_{n=0}^{63} e^{-j2\pi\Delta fnT_s} e^{-j64\Delta f2\pi T_s}$. Therefore the FCFO impact may be reduced.

Continuing further with reference to FIG. 6. In block 640, synchronizer/synchronizing block 405 selects the peak. The peak may be selected by the synchronizer 405 out of $L_W$(length of the window) hypotheses window to get HFBW (Half Frame Boundary Window) hypotheses $h_W(m)$. For example, for 9600 hypotheses; peaks selected from each window may be referred in the order starting from $g_0$ to $g_{600-1}$ out of six hundred windows each of size sixteen (as shown in FIG. 5A). The hypotheses $h_W$ (m) associated with the selected peak may be represented by the relation:

$$h_W(m)=\max_{0\leq i<L_w} h_p(mL_W+i) \quad (5)$$

and in one embodiment, $h_W(m,l,p)$ may be the hypothesis generated as in the relation (5) from $l^{th}$ half frame and $p^{th}$ PSS sequence associated with the selected peak.

In block 650, synchronizer 405 selects the peak over n frames. After selecting the peaks out of each window, the correlation may be performed by the synchronizer 405 on the next consecutive half frame to generate the hypotheses. The synchronizer 405 selects the window based peaks in the next consecutive half frame. Similarly, the correlation may be performed on the n frames and the peaks may be selected by the synchronizer 405 over n frames (as shown in FIG. 5A).

In block 660, the synchronizer 405 averages the peaks over multiple half frames. The hypothesis $h_W(m,l, p)$ derived from peaks over each frame may be averaged over several half frames to enhance the reliability of the hypotheses.

In block 670, the synchronizer 405 detects the Half Frame Boundary Window (HFBW). The peak of the averaged hypotheses provides a window, $B_W$ in whose neighbourhood HFB lies and the window $B_W$, may be referred as a half frame boundary window (as shown in FIG. 5B). The maximum of the hypotheses ($h_W(m)$) (as shown in FIG. 5B) associated with the best peak selected may be used to detect the $N^2_{id}$ (physical layer identity) thus by detecting the PSS. The HFBW may be represented by the relation:

$$(B_W, N_{id}^2)=\text{argmax}_{m,p} h_W(m,p) \quad (6)$$

in which, $h_W(m,p)$ represents the summation of the hypotheses over several half frames which may be represented by the relation:

$$h_W(m,p)=\Sigma_l h_W(m,l,p) \quad (7)$$

The window based selection of peaks improves the detection probability of PSS even in the presence of several impairments. The manner in which the sampling offset may be eliminated due to picking a peak from window is described below.

Figure 7:
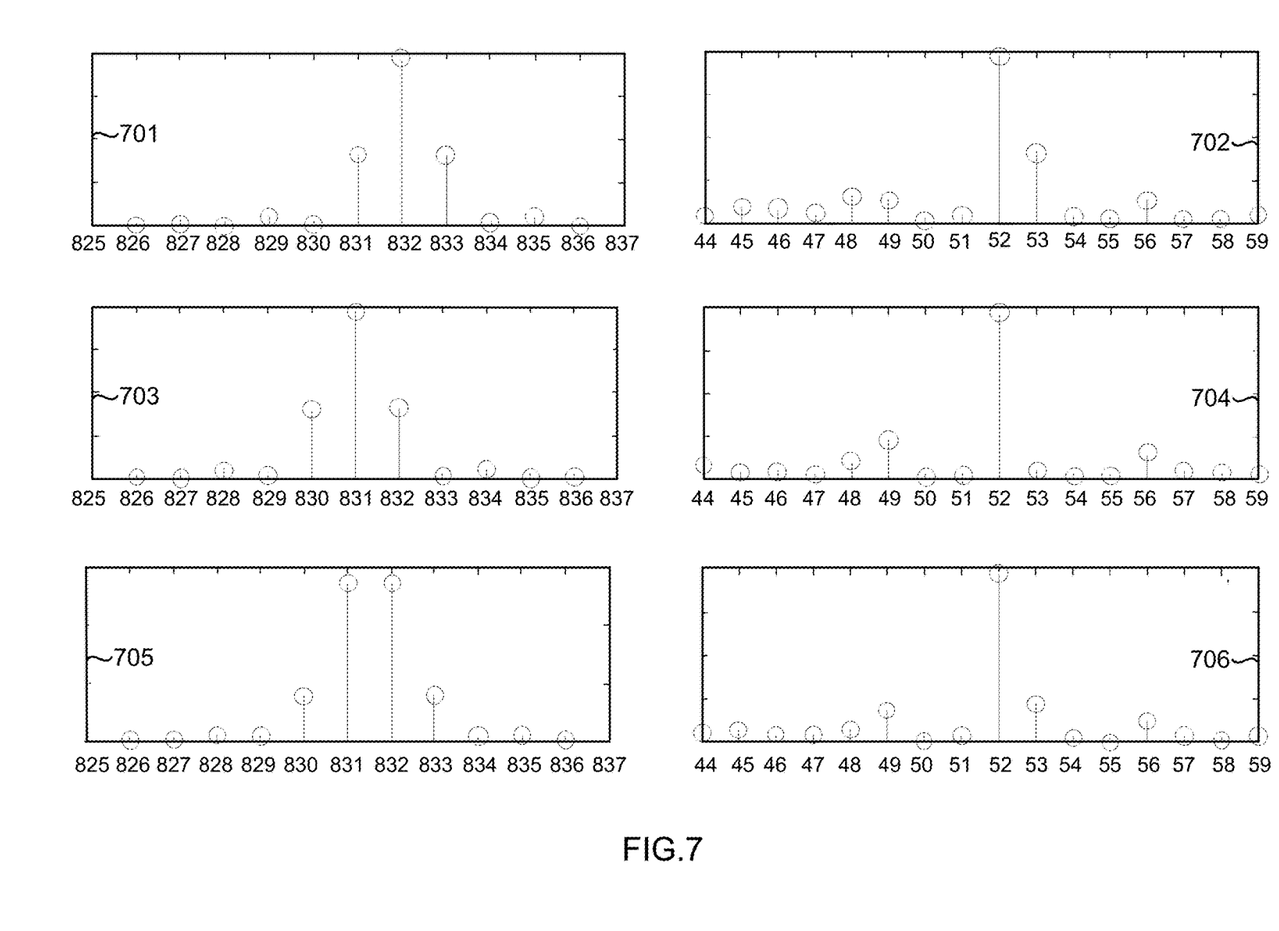
FIG. 7 depicts an example scenario illustrating elimination of effect of sampling offset due to picking a peak from a window in one embodiment.

FIG. 7 depicts an example scenario illustrating elimination of effect of sampling offset due to picking a peak from a window. In the FIG. 7, the values 825 through 837 represent the sampling position and the values 44 through 59 represent the window position. Similarly, hypotheses 701 and 703, 705 represent samples in two averaging frames and the resultant averaged frame respectively. The hypotheses 702 and 704, 706 represent windows peaks in two averaging frames and the resultant averaged frame respectively.

As may be appreciated, the sampling error results in two peaks at 831 and 832 when averaged thereby introducing the ambiguity in selecting the peak. On the other hand, due to selection of peak in a window, the ambiguity to an extent of window size is eliminated. Accordingly, the window size may be suitably selected.

To detect precise HFB, hypothesis for each sample position needs to be compared. Therefore SFO has to be low enough to allow multiple averaging of hypotheses without any significant sampling drifts. Estimating and correcting CFO reduces SFO by an equivalent amount. The biggest contributor to CFO may be ICFO. Thus ICFO may be estimated to reduce the SFO. The manner in which the effect of ICFO may be reduced/estimated/eliminated is described in detail below.

Figure 8:
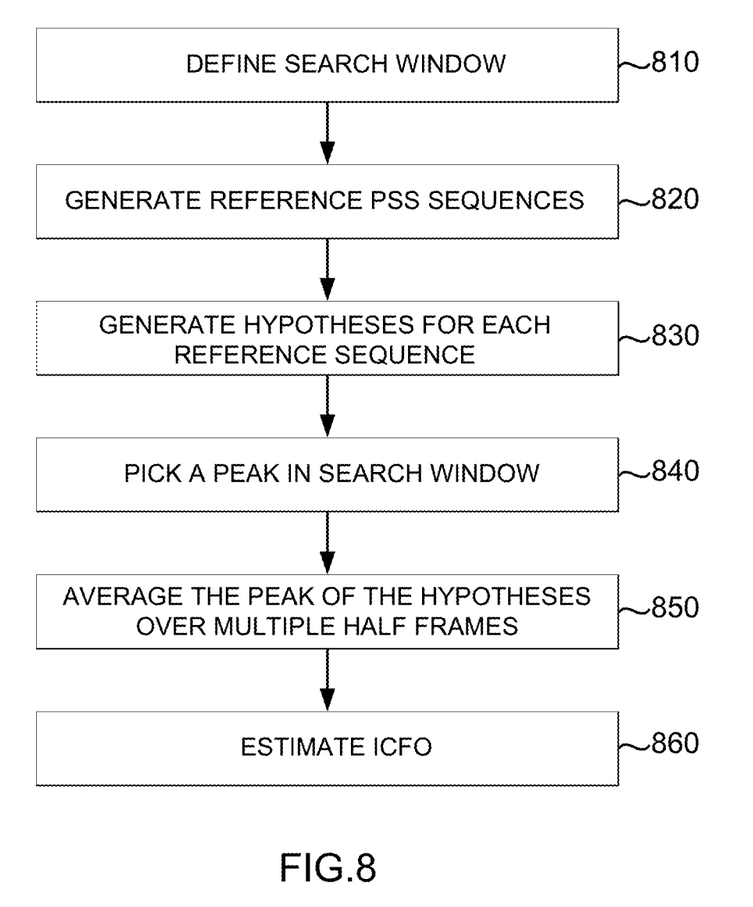
FIG. 8 is a block diagram illustrating the manner in which ICFO may be estimated in one embodiment.

FIG. 8 is a block diagram illustrating the ICFO estimation in one embodiment. In block 810, the synchronizer 405 defines a search window. A search window of length $L_1$ whose centre coincides with $B_W$ (HFBW). A search window for ICFO estimation may be wider than HFBW to compensate the peak shifts due to ICFO. A HFBW ($B_W$) may be located at the centre of the search window. For example, window of size 16 may be obtained from the window based peak selection (as described in FIG. 5B and FIG. 5C). The search window may be expanded by 64 samples about the HFBW estimated.

In block 820, the synchronizer 405 generates the local PSS versions. Every crystal oscillator present in the UE mentions the uncertainties present in the samples that leads to subcarrier shifts. For example, an inaccuracy of 20 ppm results in about 3 sub carrier shifts for carrier frequency of 2 GHz which results in the seven PSS versions.

The PSS detected from the previous stage (as shown in FIG. 5C) may be shifted such that $0^{th}$ PSS may correspond to 0 sub carrier shifts and further shifting may continue till −3 sub carrier shifts. The seven PSS versions may be generated as reference sequences in time domain. However ICFO estimation may be performed in time domain to reduce the computational complexity. The time domain reference sequences may be obtained by cyclically shifting the PSS by −K/2, . . . −1, 0, 1, 2 . . . K/2−1 positions in frequency domain and performing IFFT on the shifted PSS sequence.

In block 830, the synchronizer 405 generates the hypotheses. The shifted PSS sequences may be cross correlated with the received sequences to generate the hypotheses. For example, the hypotheses may be reduced to 144 in ICFO estimation stage for 128 point FFT. The generated hypotheses may be represented by the following relation:

$$h(c,n) = v_1(c,n)v_0(c,n)^* \quad (8)$$

in which, $v_1(c, n)$, $v_0(c, n)$ represents the partial correlation values, $c=-B, -B+1 \ldots B$, $n=L_W B_W-L_I/2, L_W B_W-L_I/2+1, \ldots L_W B_W+L_I/2-1$.

In block 840, the synchronizer 405 selects the peak within the search window. The selection of the peak within the search window provides the hypotheses for ICFO estimation. The hypotheses may be represented by the relation:

$$h_I(c) = \max_{0 \le i < L_I} h(c,n) \quad (9)$$

and in one embodiment, $h_I(l, c)$ may be the hypotheses from the half frame I.

In block 850, the synchronizer 405 averages the peak of the hypotheses over several half frames. The hypotheses associated with the selected peaks may be averaged by the synchronizer 405 over n frames to obtain ICFO. The window associated with the selected peak may be referred as ICFO search window ($W_1^2$).

In block 860, the synchronizer 405 estimates the ICFO. The ICFO may be represented by the relation:

$$ICFO = \mathrm{argmax}_c h_I(c) \quad (10)$$

in which, the hypotheses $h_I(c)$ may be represented by the following relation:

$$h_I(c) = \Sigma_l h_I(l,c) \quad (11)$$

Due to above approach, the inaccuracy in determining HFB in the subsequent stages may be reduced. Further, from the relation 10, correction may be performed based on the estimation of ICFO. For example, the correction may be applied on the UE clock to reduce the clock inaccuracy. The manner in which ICFO search window may be used to estimate HFB and FCFO is further described below in detail.

Figure 9:
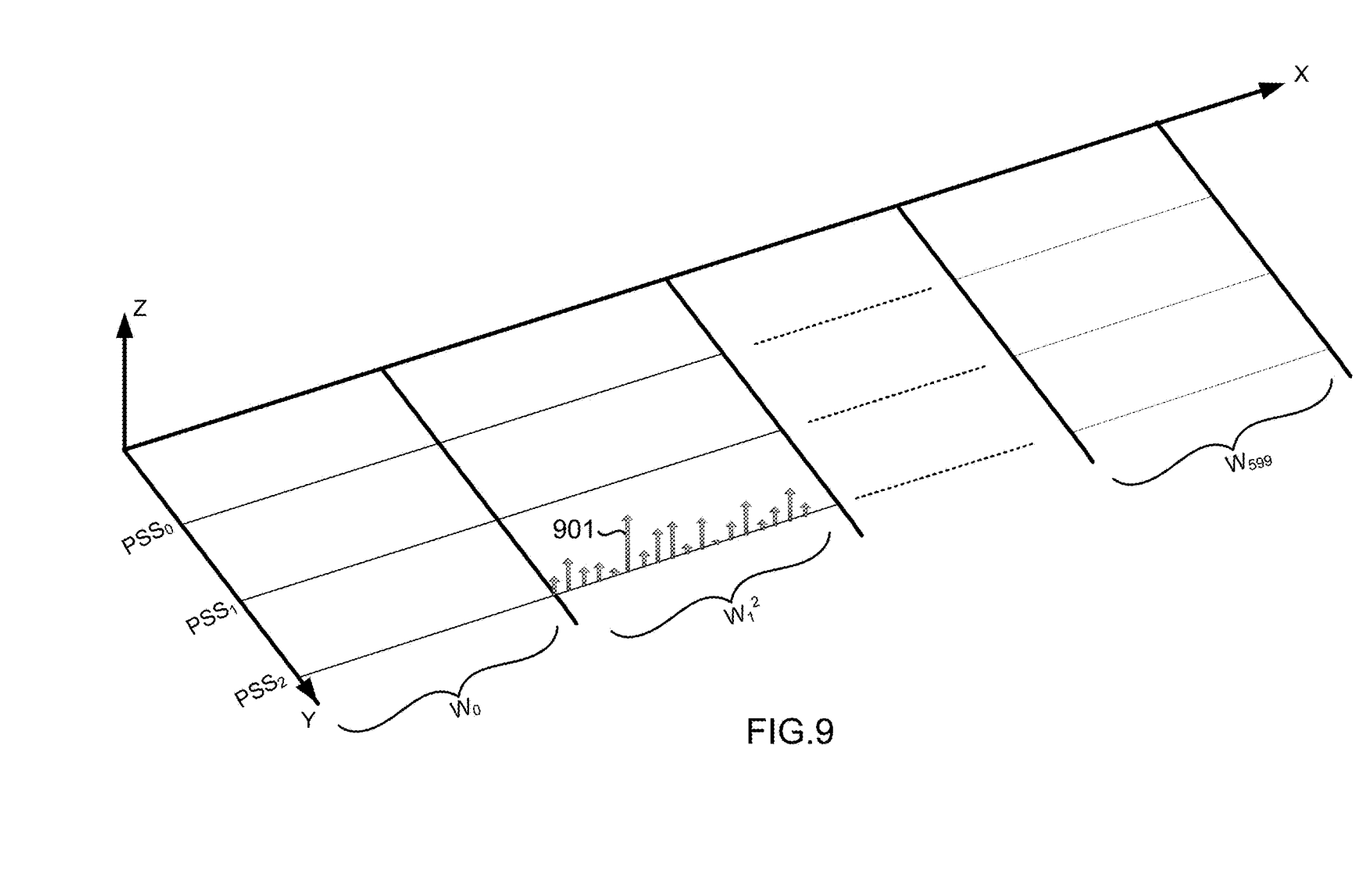
FIG. 9 is an example diagram of ICFO search window to detect HFB in one embodiment.

FIG. 9 is an example diagram of ICFO search window. As shown, X-axis represents the hypotheses, Y-axis represents the three local PSS sequences $PSS_0$ through $PSS_2$, and Z axis represents the magnitude of the hypotheses peaks.

The ICFO search window $W_1^2$ may be obtained to detect HFB. The samples (in this case 128 point FFT) within the ICFO search window $W_1^2$ may be correlated with the local PSS sequences to generate hypotheses. Similar to the detection of HFBW (as described in 5B) stage, the peak 901 may be selected.

The hypothesis associated with the peak 901 may be referred as the Half Frame Boundary (HFB). The peak 901 may be selected within ICFO search window $W_1^2$. The local PSS ($PSS_2$) corresponds to the HFB provides the accurate PSS under various impairments. The manner in which HFB, PSS and FCFO may be detected is described in detail below.

Figure 10:
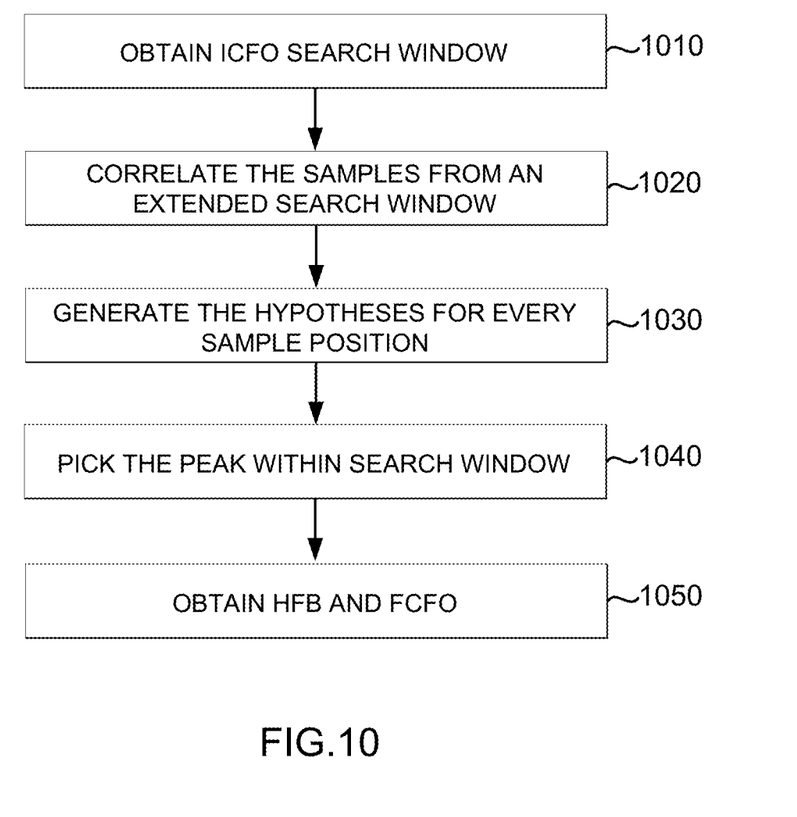
FIG. 10 is a block diagram illustrating the manner in which HFB and FCFO may be estimated in one embodiment.

FIG. 10 is a block diagram illustrating the manner in which HFB and FCFO may be detected in one embodiment. In block 1010, the synchronizer may obtain the ICFO search window (as described in FIG. 8). Further peak may be selected within the ICFO search window to detect HFB.

In block 1020, the synchronizer 405 performs correlation on the samples taken from the extended ICFO search window. The samples present within the ICFO search window may be correlated with the local PSS sequences of the UE. The values of correlation results may be differentially combined to obtain hypotheses.

In block 1030, the synchronizer 405 generates the hypotheses. The hypotheses may be generated similar to the ICFO estimation (as shown in FIG. 9). The hypotheses may be generated within the ICFO search window based on the differential combination for every sample position. The ICFO search window may be obtained from the previous method (as shown in FIG. 8) which is used to estimate ICFO.

In block 1040, the synchronizer 405 selects the peak. Within the ICFO search window, peak may be selected (as shown in FIG. 9) among the hypotheses to estimate HFB and FCFO. The peak may be selected based on the window based peak detection (as described in FIG. 5C). But the length of the window may be one and value of n may be represented as $$n = L_W B_W - L_f/2, L_W B_W - L_f/2+1 \ldots , L_W B_W + L_f/2 - 1 \quad (12)$$

In block 1050, the synchronizer 405 estimates the HFB and FCFO. The hypothesis associated with the selected peak may be referred as the HFB. The FCFO may be estimated based on the peak of the hypotheses. The local PSS corresponding to the selected peak may be referred as the recovered PLI ($N_{id}^2$). The estimated FCFO may be represented by the following relation:

$$FCFO = \Delta \tilde{f} = \frac{\arg(im(h_m)/re(h_m))}{\pi N_f T_s} \quad (13)$$

in which, $h_m$ represents the peak of the hypothesis, $N_f$ represents the size of the IFFT.

Thus a correction equal to estimated FCFO may be applied on UE clock. The refining of HFB and FCFO may be performed in non decimated domain. The manner in which the HFB and FCFO may be refined is described below.

The operations described in the blocks of FIG. 6, FIG. 8 and FIG. 10 for detecting HFBW, HFB and for estimating ICFO, FCFO may be performed by the synchronizer 405 at the sampling rate of 1.4 MHz (1.92 Ms/s) with 128 point FFT for example. But, the refining of PSS may be performed in non decimated domain. In non decimated domain, the samples from the A/D may be directly received by the synchronizer 405 with the sampling rate of 20 MHz (30.72 Ms/s) and the size of the FFT may be 2048 point (for example). The operations described in the blocks of FIG. 10 for detecting HFB may be performed on the samples at the sampling rate of 20 MHz to obtain the accurate HFB and FCFO under several impairments thus by refining the HFB and FCFO.

While various examples of the present disclosure have been described above, it should be understood that they have been presented by way of example, and not limitation. Thus, the breadth and scope of the present disclosure should not be limited by any of the above described examples, but should be defined in accordance with the following claims and their equivalents.

What is claimed is:

1. A method comprising:
   decimating a sequence of input samples that comprises a frame repeated at regular interval to generate decimated samples;
   correlating the decimated samples with a first reference sequence to generate a first set of hypotheses, wherein the first reference sequence comprises a set of samples representing at least one of three local primary synchronization signals (PSS) of a LTE communication system and the sequence of input samples representing a LTE communication signal transmitted by a base station;
   grouping the first set of hypotheses into a windows;
   selecting a peak value in each window and corresponding windows in 'N' subsequent repeated frames;
   averaging the peak values of the corresponding windows over the N subsequent repeated frames to generate a first set of averaged hypotheses;
   determining a half frame boundary window from a highest averaged hypothesis;
   multiplying the received decimated samples with the first reference sequence to form a correlation result and differentially combining the correlation results to form the first set of hypotheses;
   generating the first set of averaged hypotheses when the first reference sequence is a first local PSS;
   generating a second set of averaged hypotheses when the first reference sequence is a second local PSS;
   generating a third set of averaged hypotheses when the first reference sequence is a third local PSS; and
   determining a received PSS from a highest value in the first, second and the third set of averaged hypotheses.

2. The method of claim 1, further comprising;
   generating K versions of the first reference sequence wherein each of the versions are the first reference sequence respectively shifted by $-K/2, \ldots, -1, 0, 1, 2 \ldots K/2-1$ positions in a frequency domain;
   generating K sets of averaged hypotheses from the K versions of the first reference sequence;
   estimating an integer carrier frequency offset (ICFO) error from a position of the highest value of the averaged hypothesis; and
   correcting the ICFO error by adjusting a reference clock signal.

3. The method of claim 2, further comprising:
   grouping the decimated samples into a first group and a second group in an order;
   grouping the first reference sequence into a first half sequence and a second half sequence;
   correlating the first group with the first half sequence and the second group with the second half sequence; and
   differentially combining the two results to form a hypothesis.

4. The method of claim 3, further comprising:
   receiving input samples;
   correlating the input samples around the half frame boundary window; and
   estimating a half frame boundary(HFB) and a fractional carrier frequency offset (FCFO) from the peak value.

5. A system operative to receive LTE signals comprising:
   a decimator configured to decimate a sequence of input samples that comprises a frame repeated at regular interval to generate decimated samples; and
   a synchronizer comprising:
   a first correlator configured to receive the decimated samples with a first reference sequence to generate a first set of hypotheses, wherein the first reference sequence comprises a set of samples representing at least one of three local primary synchronization signals (PSS) of a LTE communication system and the sequence of input samples representing a LTE communication signal transmitted by a base station;
   a first aggregator configured to group the first set of hypotheses in to plurality of windows;
   a peak detector configured to select a peak value in each window and corresponding windows in 'N' subsequent repeated frames;
   an averaging block configured to average the peak values of the corresponding windows over the N subsequent repeated frames to generate a first set of averaged hypotheses;
   a half frame boundary detector configured to determine a half frame boundary window from a highest averaged hypothesis;

a multiplier configured to multiply the received decimated samples with the first reference sequence to form a correlation result and differentially combine the correlation results to form the first set of hypotheses;

a first generator configured to generate the first set of averaged hypotheses when the first reference sequence is a first local PSS;

a second generator configured to generate a second set of averaged hypotheses when the first reference sequence is a second local PSS;

a third generator configured to generate a third set of averaged hypotheses when the first reference sequence is a third local PSS; and a detecting block configured to determine a received PSS from a highest value in the first, second and the third set of averaged hypotheses.

6. The system of claim 5, further the synchronizer comprising;

a fourth generator configured to generate K versions of the first reference sequence wherein each of the K versions are the first reference sequence respectively shifted by $-K/2, \ldots -1, 0, 1, 2 \ldots K/2-1$ positions in a frequency domain;

a fifth generator configured to generate K sets of averaged hypotheses from the K versions of the first reference sequence;

a offset detector configured to estimate an integer carrier frequency offset (ICFO) error from a position of the highest value of the averaged hypothesis; and a correction block configured to correct the ICFO error by adjusting a reference clock signal.

7. The system of claim 6, further the synchronizer comprising:

a second aggregator configured to group the decimated samples into a first group and a second group in an order;

a third aggregator configured to group the first reference sequence into a first half sequence and a second half sequence;

the first correlator configured to correlate the first group with the first half sequence and the second group with the second half sequence; and a hypothesis generator configured to differentially combine the two results to form the hypothesis.

8. The system of claim 7, further the synchronizer comprising:

a receiver configured to receive input samples;

a second correlator configured to correlate the input samples around the half frame boundary window; and an estimating block configured to estimate a half frame boundary(HFB) and a fractional carrier frequency offset (FCFO) from the peak value.

* * * * *